United States Patent
Kang et al.

(10) Patent No.: US 11,985,416 B2
(45) Date of Patent: May 14, 2024

(54) ELECTRONIC DEVICE AND METHOD WITH INDEPENDENT TIME POINT MANAGEMENT

(71) Applicant: Samsung Electronics Co., Ltd., Suwon-si (KR)

(72) Inventors: Chul Woo Kang, Suwon-si (KR); Wonhee Lee, Yongin-si (KR); Kyungboo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 17/729,677

(22) Filed: Apr. 26, 2022

(65) Prior Publication Data
US 2023/0209181 A1    Jun. 29, 2023

(30) Foreign Application Priority Data
Dec. 28, 2021    (KR) .................. 10-2021-0189333

(51) Int. Cl.
*H04N 23/60*    (2023.01)
*G06T 7/80*    (2017.01)

(52) U.S. Cl.
CPC ............... *H04N 23/64* (2023.01); *G06T 7/80* (2017.01); *G06T 2207/10016* (2013.01); *G06T 2207/30244* (2013.01)

(58) Field of Classification Search
CPC . H04N 23/64; G06T 7/80; G06T 2207/10016; G06T 2207/30244;
(Continued)

(56) References Cited

U.S. PATENT DOCUMENTS

| 8,504,864 B2 | 8/2013 | Menon et al. |
| 9,971,443 B2 | 5/2018 | Rodrigues De Araujo et al. |

(Continued)

FOREIGN PATENT DOCUMENTS

| KR | 10-2006-0043423 A | 5/2006 |
| KR | 10-0813966 B1 | 3/2008 |

(Continued)

OTHER PUBLICATIONS

Tschopp, Florian, et al. "VersaVIS—An Open Versatile Multi-Camera Visual-Inertial Sensor Suite." *Sensors* vol. 20 Issue 5 DOI:10.3390/s20051439 Mar. 6, 2020 (18 pages in English).

(Continued)

*Primary Examiner* — Usman A Khan
(74) *Attorney, Agent, or Firm* — NSIP Law

(57) ABSTRACT

An electronic device includes: a timekeeping processor configured to: determine a sensing time point of reference sensing data, generated through sensing by a reference sensor of a plurality of sensors, and a sensing time point of other sensing data of another sensor of the plurality of sensors, based on a clock rate of the timekeeping processor; determine a time difference between the sensing time point of the reference sensing data and the sensing time point of the other sensing data; and determine a task latency from the sensing time point of the reference sensing data to a task complete time point based on the clock rate of the timekeeping processor; and one or more other processors configured to correct, based on the task latency, a task result processed according to localization of the electronic device determined for the sensing time point of the reference sensing data based on the determined time difference, the reference sensing data, and the other sensing data.

28 Claims, 10 Drawing Sheets

(58) Field of Classification Search
CPC ... G06T 15/005; G06T 19/006; G06V 10/803; G06V 20/20; G06F 1/14; G06F 3/011; G06F 3/012; G06F 3/0304
USPC ..................................................... 348/222.1
See application file for complete search history.

(56) References Cited

U.S. PATENT DOCUMENTS

| | | |
|---|---|---|
| 10,180,340 B2 | 1/2019 | Milota et al. |
| 11,016,560 B1 | 5/2021 | Wenger et al. |
| 2005/0283820 A1* | 12/2005 | Richards .......... H04N 21/41415 725/146 |
| 2010/0177600 A1* | 7/2010 | Brykowski .......... G04G 9/0011 368/11 |
| 2015/0185054 A1 | 7/2015 | Hesch et al. |
| 2015/0342571 A1* | 12/2015 | Ohuchi ................. A61B 8/461 382/128 |
| 2017/0115488 A1* | 4/2017 | Ambrus ............. G02B 27/0172 |
| 2019/0206115 A1* | 7/2019 | Tytgat .................... G06T 15/20 |

FOREIGN PATENT DOCUMENTS

| | | |
|---|---|---|
| KR | 10-1009420 B1 | 1/2011 |
| KR | 10-1322841 B1 | 10/2013 |
| KR | 10-2013-0123160 A | 11/2013 |
| KR | 10-1435181 B1 | 9/2014 |
| KR | 10-1728408 B1 | 4/2017 |
| KR | 10-2200451 B1 | 1/2021 |

OTHER PUBLICATIONS

Extended European search report dated Dec. 22, 2022, in counterpart European Patent Application No. 22180224.2 (10 pages in English).

* cited by examiner

ELECTRONIC DEVICE AND METHOD WITH INDEPENDENT TIME POINT MANAGEMENT

CROSS-REFERENCE TO RELATED APPLICATIONS

This application claims the benefit under 35 USC § 119(a) of Korean Patent Application No. 10-2021-0189333, filed on Dec. 28, 2021 in the Korean Intellectual Property Office, the entire disclosure of which is incorporated herein by reference for all purposes.

BACKGROUND

1. Field

The following disclosure relates to an electronic device and method with independent time point management.

2. Description of Related Art

A camera may not implement precise time control when being used as a simple image capturing device, as the camera may perform computations through sequential processing according to the performance of a computing device through simple scheduling and the camera may perform operations in a manner of outputting results when the results are obtained. On the other hand, a system implementing strict time control, such as an aircraft or a robot, may perform computations ensuring an accurate processing time using a real-time operating system (RTOS).

Inexpensive sensor systems may be implemented in in general consumer electronic devices such as cell phones. Sensor fusion operations may be used in various devices including control systems having autonomous driving. In these applications, it may be difficult to use a system such as the aforementioned RTOS due to cost and convenience. For example, a simultaneous localization and mapping (SLAM) algorithm in a robot or a vehicle may require strict time control for accurate performance, but adverse to such requirement, the robot or vehicle may include a combination of sensors not temporally synchronized with a typical general-purpose operating system (OS).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a timekeeping processor configured to: determine a sensing time point of reference sensing data, generated through sensing by a reference sensor of a plurality of sensors, and a sensing time point of other sensing data of another sensor of the plurality of sensors, based on a clock rate of the timekeeping processor; determine a time difference between the sensing time point of the reference sensing data and the sensing time point of the other sensing data; and determine a task latency from the sensing time point of the reference sensing data to a task complete time point based on the clock rate of the timekeeping processor; and one or more other processors configured to correct, based on the task latency, a task result processed according to localization of the electronic device determined for the sensing time point of the reference sensing data based on the determined time difference, the reference sensing data, and the other sensing data.

The device may include: a plurality of sensors configured to generate the reference sensing data and the other sensing data; and an output interface configured to output the corrected task result based on the task latency.

For the determining of the task latency, the timekeeping processor may be configured to determine a rendering latency from the sensing time point of the reference sensing data to a time point when rendering of an image for augmented reality (AR) is completed, and for the correcting, the one or more other processors may be configured to generate an output image by correcting an image rendered according to the localization of the electronic device determined for the sensing time point of the reference sensing data based on the rendering latency.

The reference sensor may include any one or any combination of any two or more of a vision sensor of a camera sensor configured to capture a camera image, a radar sensor configured to sense radar data, and a lidar sensor configured to sense a lidar image.

For the generating of the sensing data, the reference sensor may include a camera sensor configured to capture a camera image, and for the determining of the sensing time point of the reference sensing data, the timekeeping processor may be configured to calibrate a sensing time point of the camera sensor based on either one or both of an exposure time and a read time of the camera image.

The localization of the electronic device may include either one or both of a pose and a location of the electronic device.

For the correcting, the one or more other processors may be configured to perform warping based on any one or any combination of any two or more of a rotation transform, a translation, and a scale change corresponding to a localization change of the electronic device during the task latency from the sensing time point of the reference sensing data to the task complete time point.

The other sensor may include any one or any combination of any two or more of an inertial measurement unit (IMU) configured to sense an inertia of the electronic device, an active sensor configured to perform sensing in response to receiving a trigger input, and a passive sensor configured to perform sensing at predetermined intervals.

For the correcting, a main processor of the one or more other processors may be configured to determine the localization of the electronic device for the sensing time point of the reference sensing data based on the determined time difference, the reference sensing data, and the other sensing data, and a sub-processor of the one or more other processors may be configured to generate a rendered image as a task result for the localization.

The device may include a communication module configured to, for the determining of the time difference, transmit sensing time points of the sensing data of the plurality of sensors and the time difference to an external device and receive the task result from the external device, wherein the timekeeping processor may be configured to, for the determining of the task latency, determine the task latency based on a time point when the task result is received.

The task latency may include a transmission delay and a reception delay according to communication of the communication module, and a time when the task is performed by the external device.

In another general aspect, a processor-implemented method includes: determining a sensing time point of reference sensing data, generated through sensing by a reference sensor of a plurality of sensors, and a sensing time point of other sensing data of another sensor of the plurality of sensors, based on a clock rate of a timekeeping processor; determining a time difference between the sensing time point of the reference sensing data and the sensing time point of the other sensing data; determining a task latency from the sensing time point of the reference sensing data to a task complete time point based on the clock rate of the timekeeping processor; and correcting, based on the task latency, a task result processed by one or more other processors according to localization of the electronic device determined for the sensing time point of the reference sensing data based on the determined time difference, the reference sensing data, and the other sensing data.

The method may include: generating, by a plurality of sensors, the reference sensing data and the other sensing data; and outputting the corrected task result based on the task latency.

The determining of the task latency may include determining a rendering latency from the sensing time point of the reference sensing data to a time point when rendering of an image for augmented reality (AR) is completed, and the correcting may include generating an output image by correcting an image rendered according to the localization of the electronic device determined for the sensing time point of the reference sensing data based on the rendering latency.

The generating of the sensing data may include generating the reference sensing data by performing any one or any combination of any two or more of an operation of capturing a camera image by a camera sensor of the reference sensor, an operation of sensing radar data by a radar sensor of the reference sensor, and an operation of sensing a lidar image by a lidar sensor of the reference sensor.

The generating of the sensing data may include capturing a camera image by a camera sensor that is the reference sensor, and the determining of the sensing time point of the reference sensing data may include calibrating a sensing time point of the camera sensor based on either one or both of an exposure time and a read time of the camera image.

The localization of the electronic device may include either one or both of a pose and a location of the electronic device.

The correcting may include performing warping based on any one or any combination of any two or more of a rotation transform, a translation, and a scale change corresponding to a localization change of the electronic device during the task latency from the sensing time point of the reference sensing data to the task complete time point.

The generating of the sensing data may include generating the other sensing data by performing any one or any combination of any two or more of an operation of sensing an inertia of the electronic device by an inertial measurement unit (IMU) of the sensors, an operation of performing sensing by an active sensor of the sensors in response to receiving a trigger input, and an operation of performing sensing by a passive sensor of the sensors at predetermined intervals.

The correcting may include: determining the localization of the electronic device for the sensing time point of the reference sensing data based on the determined time difference, the reference sensing data, and the other sensing data; and generating a rendered image as a task result for the localization.

The determining of the time difference may include transmitting sensing time points of the sensing data of the plurality of sensors and the time difference to an external device, and the determining of the task latency may include receiving the task result from the external device and determining the task latency based on a time point when the task result is received.

In another general aspect, one or more embodiments include a non-transitory computer-readable storage medium storing instructions that, when executed by either one or both of the timekeeping processor and the one or more other processors, configure either one or both of the timekeeping processor and the one or more other processors to perform any one, any combination, or all operations and methods described herein.

In another general aspect, an electronic device includes: a processor configured to: determine a sensing time point of first sensing data of a first sensor and a sensing time point of second sensing data of a second sensor, dependent on a clock rate of the processor; determine a time difference between the sensing time point of the first sensing data and the sensing time point of the second sensing data, wherein a task is performed for the sensing time point of the first sensing data by one or more other processors based on the determined time difference; and determine a task latency of the performed task from the sensing time point of the first sensing data to a task complete time point of the performed task, based on the clock rate of the processor, wherein the one or more other processors may be configured to control the electronic device based on the determined task latency.

For the determining of the sensing time point of the second sensing data, the processor may be configured to determine, in response to receiving a sensing trigger of the second sensing data from the second sensor, the sensing time point of the second sensing data as being a next subsequent timing updated according to the clock rate of the processor after the sensing trigger is received.

For the determining of the sensing time point of the first sensing data, the processor may be configured to, in response to receiving a sensing trigger of the first sensing data from the first sensor: determine a next subsequent timing updated according to the clock rate of the processor after the sensing trigger is received; determine a calibration time of the first sensor based on one or more processing times of the first sensor; and determine the sensing time point of the first sensing data based on a difference between the next subsequent timing and the calibration time.

The one or more processing times may include a read time of the first sensor and an exposure time of the first sensor.

The clock rate of the processor may be different than a clock rate of each of first sensor and the second sensor.

For the controlling, the one or more other processors may be configured to correct a task result of the performed task based on the task latency.

Other features and aspects will be apparent from the following detailed description, the drawings, and the claims.

Figure 1:
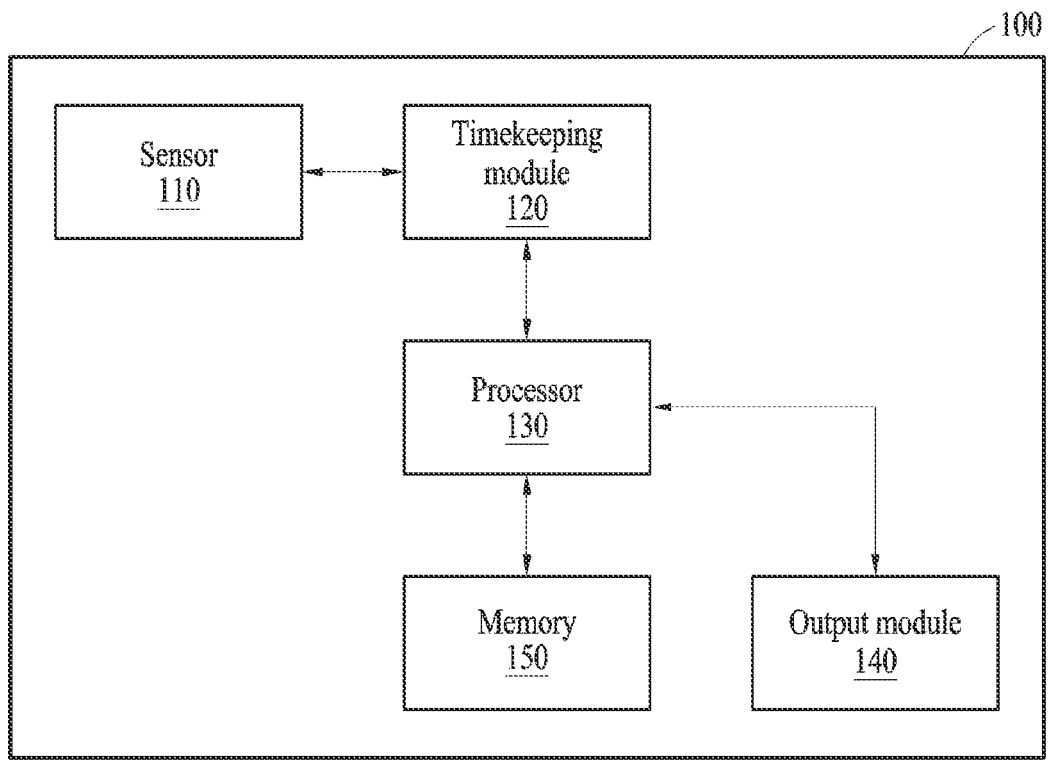
FIG. 1 illustrates an example of an electronic device including a timekeeping module.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms, such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. The term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an electronic device including a timekeeping module.

Referring to FIG. 1, an electronic device 100 may include a sensor 110 (e.g., one or more sensors), a timekeeping module 120, a processor 130 (e.g., one or more processors), an output module 140 (e.g., a user interface including a display), and a memory 150 (e.g., one or more memories). For example, the electronic device 100 may determine localization of the electronic device 100 based on sensing data generated through a plurality of sensors. The localization of the electronic device 100 may include either one or both of a pose and a location of the electronic device 100. The electronic device 100 may perform a sensor fusion operation on the sensing data generated through the plurality of sensors. The electronic device 100 may perform software synchronization of the plurality of sensors to perform the sensor fusion operation. For example, the software synchronization may be accurately monitoring times of sensing by the sensors and a difference between the times of sensing, in the sensor fusion operation. The electronic device 100 may determine the localization of the electronic device 100 by performing the sensor fusion operation in view of the difference between the times of sensing, without forcibly matching measurement times of sensing by the sensors.

The sensor 110 may include a plurality of sensors. The plurality of sensors may generate sensing data for localization through sensing. For example, one or more of the plurality of sensors may be a heterogeneous sensor that generates different types of sensing data from that of another sensor of the plurality of sensors. Of the plurality of sensors, a reference sensor may be a sensor that generates reference sensing data that serves as a reference for localization. The other sensor may be a sensor that generates other sensing data used to perform localization in addition to the reference sensing data. The localization may be determined based on the reference sensing data and the other sensing data with respect to a sensing time point of the reference sensing data (e.g., a reference sensing time point).

For example, the reference sensor may include a vision sensor. The vision sensor may be a sensor for performing vision-based sensing and may include, for example, a camera sensor, a radar sensor, a lidar sensor, and/or an ultrasonic sensor, as a non-limiting example. The camera sensor may capture a camera image. The radar sensor may sense radar data. The lidar sensor may sense a lidar image. However, examples are not limited thereto. The vision sensor may include a depth camera sensor, a stereo camera sensor, a multi-camera sensor, and/or a single-camera sensor.

The other sensor may include any one or any combination of any two or more of an inertial measurement unit (IMU) configured to sense an inertia of the electronic device 100, an active sensor configured to perform sensing in response to receiving a trigger input, and a passive sensor configured to perform sensing at predetermined intervals. The IMU may be a sensor for measuring an inertia applied thereto and may sense a 3-axis acceleration and/or a 3-axis angular velocity. The active sensor may perform sensing in response to receiving a trigger input and thus, may generate sensing data irregularly based on the received trigger input. The passive sensor may perform sensing at intervals according to its clock and thus, may generate sensing data regularly. For reference, the timekeeping module 120 may control a timing of a trigger input for the active sensor and apply the trigger input to the active sensor.

Herein, an example of the reference sensor being a vision sensor (e.g., a camera sensor) and the other sensor being an IMU is described only for purposes of ease of explanation. However, the reference sensor and the other sensor are not limited thereto.

The timekeeping module 120 may operate at a separate clock rate from and independently of the processor 130 (non-limiting examples of which will be described later), and generate, record, calibrate, store, and manage time information related to a target task in the electronic device 100. The time information related to the target task may include sensing time points determined for the respective sensing data, a time difference between the sensing data (non-limiting examples of which will be described later), and a task latency (non-limiting examples of which will be described later). The timekeeping module 120 may store accurate time information of the respective sensing data. The timekeeping module 120 may provide the stored time information of the sensing data to a processor (e.g., the internal application processor 130 or a processor of an external device) during an operation for the target task.

The target task may be a task to be performed with respect to the determined localization, and may include one or more operations and/or computations to be performed at the localization determined with respect to the electronic device 100. For example, when the electronic device 100 is a device that provides augmented reality (AR) and/or virtual reality (VR), the target task may include an operation of rendering an image for AR and/or VR (e.g., an image including virtual content) to be provided to a user at the localization determined with respect to the electronic device 100. As another example, when the electronic device 100 is implemented as a robot, the target task may include a series of operations (e.g., recognizing a periphery and/or outputting recognition results) for performing an action (e.g., serving an article, guiding with voice, and/or interacting with a peripheral object such as opening a door) to be performed at a localization determined with respect to the robot. As still another example, when the electronic device 100 is mounted on, or is, a vehicle (e.g., a car, an aircraft, and/or a watercraft), the target task may include an operation (e.g., recognizing a periphery and steering and/or controlling a speed according to recognition results) for driving and/or flying at a localization determined with respect to the electronic device 100. However, the examples of the target task are not limited thereto.

The timekeeping module 120 may record sensing time points (e.g., timestamps) for respective sensors. For example, the timekeeping module 120 may determine a sensing time point of reference sensing data (e.g., a reference sensing time point) generated through sensing by a reference sensor and a sensing time point of other sensing data of another sensor (e.g., another sensing time point), among the plurality of sensors, based on a clock rate of the timekeeping module 120. The timekeeping module 120 may separately record and manage a timestamp corresponding to the reference sensing time point and a timestamp corresponding to the other sensing time point. For reference, the timekeeping module 120 may include a clock generation circuit that operates at a clock rate (e.g., a clock frequency) independent of a clock (or clock rate thereof) of the processor 130. The clock rate of the timekeeping module 120 may be faster than the sensing frequencies of the plurality of sensors. The timekeeping module 120 of one or more embodiments may determine, independently of the processor 130, the respective sensing time points at a clock rate faster than the sensing frequencies of the sensors, thereby more accurately recording and managing the sensing time points. For example, the clock rate of the timekeeping module 120 may be more than 100 times faster than the fastest sensing frequency of the plurality of sensors. However, the example of the clock rate is not limited thereto.

The timekeeping module 120 may also include a memory for storing time information related to the target task and timing calibration information for timing calibration of the time information. The timekeeping module 120 may calculate (e.g., determine) more precise sensing time points by calibrating the sensing time points using the timing calibration information. A non-limiting example of the timing calibration information will be described below with reference to FIG. 5.

The timekeeping module 120 may calculate a time difference between the sensing time point of the reference sensing data and the sensing time point of the other sensing data. For example, the timekeeping module 120 may calculate a time difference from the other sensing time point based on the reference sensing time point, e.g., because the electronic device 100 may obtain (e.g., determine) localization based on the reference sensing time point, a non-limiting example of which will be described below.

The timekeeping module 120 may determine a task latency from the sensing time point of the reference sensing data to a task complete time point based on the clock rate of the timekeeping module 120. The task latency may be a latency time taken from the reference sensing time point to the task complete time point. The timekeeping module 120 may record the task complete time point (e.g., a time point when rendering is completed), and calculate a time from a last reference time point immediately before a task is initiated to the task complete time point as the task latency. For example, when the target task is to render an image for AR, the task complete time point may be a time point when rendering is completed. The task latency may include a rendering latency. The timekeeping module 120 may determine a rendering latency from the sensing time point of the reference sensing data to a time point when rendering of an image for AR is completed.

The processor 130 may obtain the localization of the electronic device 100 determined for the sensing time point of the reference sensing data based on the calculated time difference, the reference sensing data, and the other sensing data. The processor 130 may obtain a task result processed with respect to the localization. When the target task is to render an image for AR, the task result may include a rendered image to be provided to a user at the localization at the reference sensing time point. For example, a field of view corresponding to a view direction of the user may be determined based on a location and an orientation of the electronic device 100 included in the localization. The task result may include an AR image having virtual content to be provided to or in the field of view corresponding to the view direction.

The processor 130 may correct, based on the task latency, a task result processed according to the localization of the electronic device 100 determined for the sensing time point of the reference sensing data based on the calculated time difference, the reference sensing data, and the other sensing data. The processor 130 may compensate for changed localization (e.g., a movement and a direction change) during the task after the reference sensing time point in the task result. For example, when the target task is to render an image for AR, the processor 130 may generate an output image by correcting an image rendered according to the localization of the electronic device determined for the sensing time point of the reference sensing data based on the rendering latency.

In an example, the processor 130 may be implemented as an application processor including a main processor and a sub-processor as one or more processors. As described below with reference to FIG. 2, an operation of determining the localization of the electronic device 100 and an operation of processing the task (e.g., rendering) corresponding to the determined localization may be performed by the application processor. However, examples are not limited thereto. As another example, as described below with reference to FIG. 7, the operation of determining the localization of the electronic device 100 and the operation of processing the task corresponding to the determined localization may be performed by an external device, and the processor 130 of the electronic device 100 may receive and obtain the determined localization and the task result according to the localization from the external device.

The hardware including output module 140 may output a corrected task result based on the task latency. The output module 140 may output any one or any combination of any two or more of visual information, auditory information, and tactile information according to the form of the task result. For example, when the target task is to render an image for AR, the output module 140 may include a display for displaying an output image generated to provide AR. The output module 140 may generate a user interface and render the image using the generated user interface, for example.

The memory 150 may store instructions that, when executed by the processor 130, configure the processor 130 to perform any one, any combination, or all operations of the processor 130. The memory 150 may include, for example, a random-access memory (RAM), a dynamic RAM (DRAM), a static RAM (SRAM), or other types of non-volatile memory that are known in the related technical field.

The electronic device 100 of one or more embodiments may obtain the localization (e.g., the pose and the location) with respect to, or corresponding to, the reference sensing time point based on sensing data for respective multiple sensors when actually calculating the target task, thereby performing more precise motion estimation. Further, the electronic device 100 of one or more embodiments may provide the user with a result (e.g., a corrected task result) of compensating for the localization change from the localization determination at the reference sensing time point to a time point when the task result is outputted, thereby providing the user with a more accurate result.

As described above, the electronic device 100 may include the separate timekeeping module 120 independent of the application processor. The timekeeping module 120 may include a clock generation circuit that operates with a relatively accurate clock (e.g., a more accurate clock than a clock of one or more sensors of the sensor 110). The timekeeping module 120 may monitor operating times of the sensors, times taken for the operations (e.g., sensing) of the sensors, and a time taken for an operation for the target task by the processor 130 and/or the external device all. Accordingly, the timekeeping module 120 may calculate an end-to-end latency (e.g., the task latency) from a sensing time point of a sensor (e.g., a timestamp recorded for sensing) based on the monitored time information. Accordingly, the electronic device 100 of one or more embodiments implemented as a real-time system (e.g., an AR device, a simultaneous localization and mapping (SLAM) device, and various mechanical control devices) measuring or controlling a motion may minimize an error caused by an end-to-end latency occurring in an end-to-end operation.

Sensor fusion may implement strict time synchronization of sensors included in hardware. As described above, the electronic device 100 of one or more embodiments may record and manage sensing time points for respective sensors through the timekeeping module 120, thereby applying sensor fusion even to sensors having different clock rates. For example, when outputs of the respective sensors are generated according to individual clocks of the respective sensors, output intervals of the heterogeneous sensors may be asynchronous. In addition, commercial sensors may output and transmit sensor data periodically according to their own clock rates, and clock rates generated by clock circuits mounted in the individual sensors may show significant errors.

In addition to the errors or differences of the clock rates for the respective sensors, for electromagnetic or communication reasons, the intervals for sampling sensing data from the sensors may vary. For example, in the case of low-cost IMUs commonly used in cell phones, clock rates may vary up to approximately 10% depending on a situation. According to a comparative example, the electronic device 100 of one or more embodiments may calculate the velocity or pose by integrating an angular velocity or acceleration sensed through the IMU. When the integral of the angular velocity or acceleration is used, a change in time reference in the estimation using the IMU data may be linearly reflected in a measurement error. In the case of camera sensors, shutter speeds and data processing rates may vary for the respective camera sensors even when an image is captured at the same frames per second (fps). Accordingly, data having different latencies and different sampling intervals may be generated for each frame image measurement. This may make it difficult for a typical electronic device to specify data measured at the same time as data generated through a first camera sensor from among data generated by first camera sensors and having different latencies. For reference, a portion of the sensors (e.g., a camera sensor) may be designed or configured to receive a trigger input, but it may be difficult to control a trigger input timing.

The electronic device 100 of one or more embodiments may record the accurate sensing time points of the sensing data based on the clock rate of the timekeeping module 120 despite the errors described above and thus, may accurately perform a localization operation (e.g., SLAM) based on sensor fusion. The electronic device 100 of one or more embodiments may even record the sensing time points for the respective sensors regardless of the presence or absence of a trigger, and thus, the diversity and flexibility in selecting a sensor for the electronic device 100 may be secured in a development stage.

Furthermore, the electronic device 100 of one or more embodiments may also help toward preventing, or prevent, a latency issue due to a computation time occurring in AR. The processor 130 may accurately manage task scheduling results of general-purpose operating systems (OS) and variable latencies caused by a difference in amount of computation in each situation, whereby the electronic device 100 of one or more embodiments may reduce or minimize errors caused by an end-to-end latency.

Figure 2:
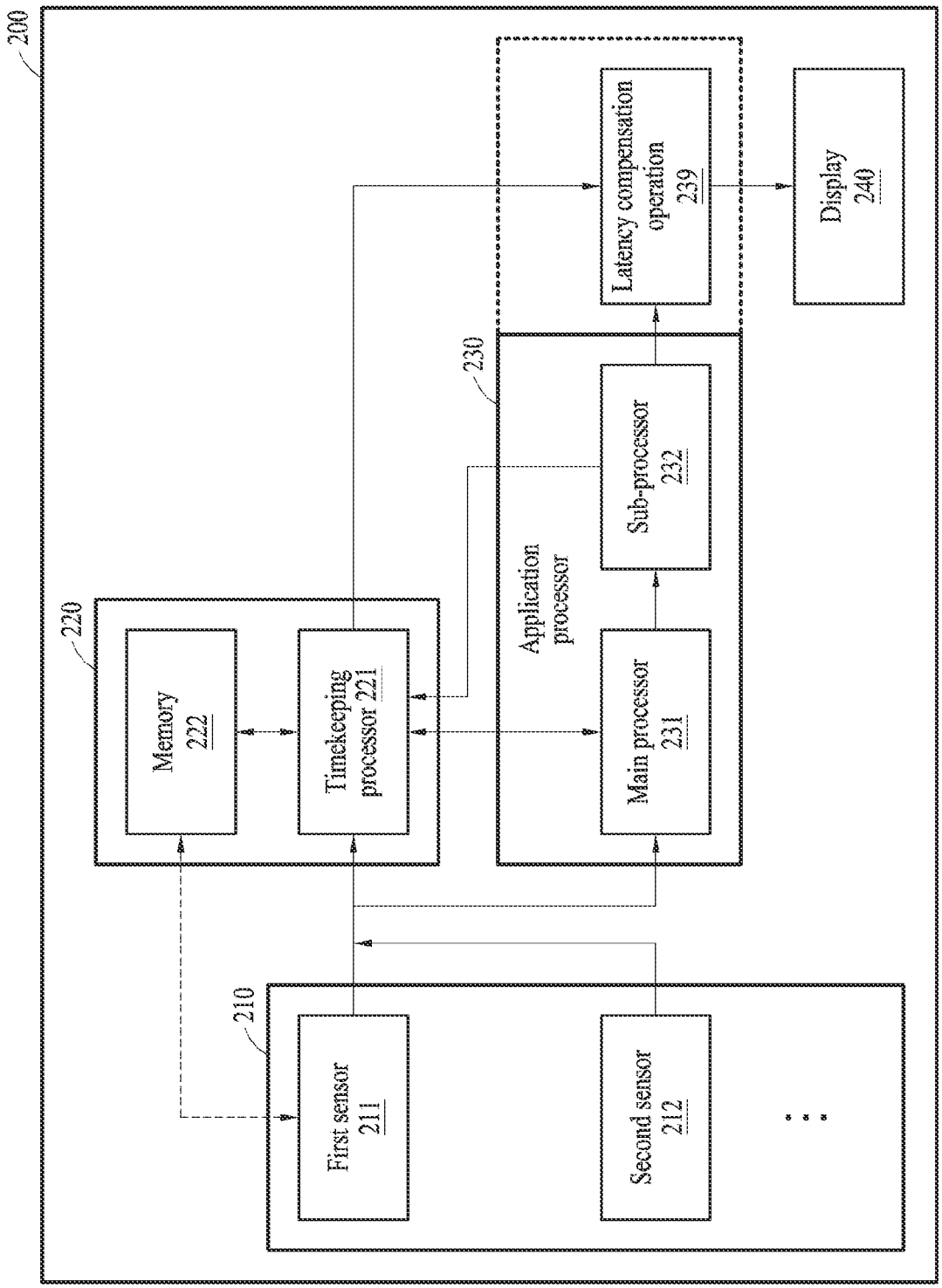
FIGS. 2 and 3 illustrate examples of performing an operation for a task internally by an electronic device.
Figure 3:
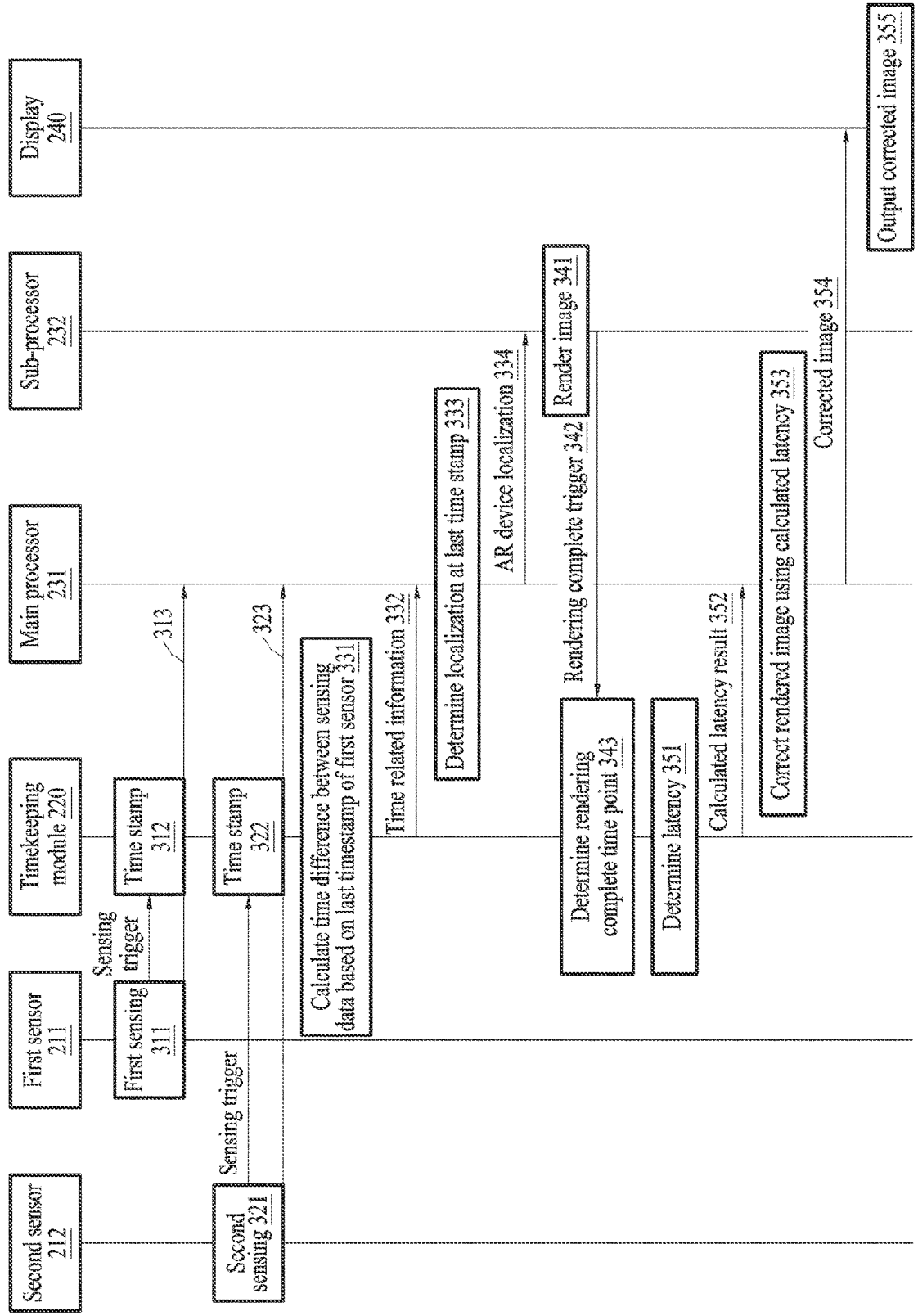

FIGS. 2 and 3 illustrate examples of performing an operation for a task internally by an electronic device.

In FIG. 2, an example in which sensors 210 (e.g., the sensor 110 of FIG. 1 as a non-limiting example) include a first sensor and a second sensor, a timekeeping module 220 (e.g., the timekeeping module 120 of FIG. 1 as a non-limiting example) includes a timekeeping processor 221 and a memory 222, and an application processor 230 (e.g., the processor 130 of FIG. 1 as a non-limiting example) includes a main processor 231 and a sub-processor 232 is shown. The main processor may be a central processing unit (CPU), and the sub-processor may be a graphics processing unit (GPU). However, examples are not limited thereto. The output module 140 of FIG. 1 may be implemented as a display 240. Hereinafter, a non-limiting example in which a target task is to provide an AR image for AR is mainly described.

When the target task is to generate an AR image for AR, a main operation of an electronic device 200 may include an operation of determining localization (e.g., SLAM vision), an operation of modeling a surrounding environment of the electronic device 200 in three-dimensional (3D) geometry (e.g., interpreting and/or modeling a physical object, a person, and a background in 3D coordinates), and an operation of generating and rendering an AR image including virtual content (e.g., a virtual object). The operation of determining the localization and the operation of modeling the surrounding environment in 3D geometry may be performed by the main processor 231. Rendering the AR image may be performed by the sub-processor 232. For example, the main processor 231, of one or more processors of the application processor 230, may determine localization of the electronic device 200 based on a time difference calculated for a sensing time point of reference sensing data (e.g., first sensing data) (e.g., a difference between sensing time points from first sensing to second sensing), the reference sensing data (e.g., the first sensing data), and other sensing data (e.g., second sensing data). The sub-processor 232, of the one or more processors, may generate a rendered image as a task result for the localization. An example in which the electronic device 200 including the main processor 231 and the sub-processor 232 autonomously performs a task-related operation will be described below.

For example, in operation 311, the first sensor 211 may generate first sensing data by performing first sensing. The timekeeping module 220 may receive a sensing trigger of the first sensing in response to the occurrence of the first sensing (e.g., the first sensor 211 may generate and transmit the sensing trigger of the first sensing to the timekeeping module 220, in response to the performing of the first sensing). The sensing trigger may be a signal from each sensor to inform the timekeeping module 220 of the generation of sensing data, and may, for example, indicate that the corresponding sensor has completed capturing an image and/or has sensed acceleration. In operation 312, the timekeeping module 220 may determine and record, for the first sensing data, a timestamp of a clock timing at which the sensing trigger is received. Non-liming examples of recording the clock timing and the timestamp will be described below with reference to FIGS. 4 and 5. In operation 321, the second sensor 212 may generate second sensing data by performing second sensing. The timekeeping module 220 may receive a sensing trigger of the second sensing in response to the occurrence of the second sensing. In operation 322, the timekeeping module 220 may determine and record a timestamp for the second sensing data based on a clock rate of the timekeeping module 220. For reference, the timekeeping module 220 may determine the above-described sensing time points based on the clock rate of the timekeeping processor 221, and store the determined sensing time points in the memory 222.

In operations 313 and 323, the first sensor 211 and the second sensor 212 may each transmit sensing data to the main processor 231. For reference, as an example, only the first sensor 211 and the second sensor 212 are shown in FIGS. 2 and 3 for ease of explanation. However, examples are not limited thereto. In the present specification, the sensors 210 may include n sensors, where n may be an integer greater than or equal to "2".

For reference, the timekeeping module 220 may generate a trigger input and provide the trigger input to a sensor capable of receiving (or configured to receive) the trigger input (e.g., an active sensor), of the first sensor 211 and the second sensor 212. The sensor configured to receive the trigger input may perform sensing in response to receiving the trigger input. Accordingly, a timing of the trigger input may also be determined based on the clock rate of the timekeeping module 220. In the present specification, a camera sensor is described as an example of the first sensor 211 (e.g., a reference sensor). However, examples are not limited thereto. Other vision sensors such as a radar sensor and a lidar sensor may also be operated as the reference sensor in the same manner as the camera sensor.

In operation 331, the timekeeping module 220 may calculate a time difference for each sensing data. For example, the timekeeping module 220 may calculate a time difference between sensing data based on a last timestamp of the first sensor 211. The timekeeping module 220 may calculate and record a time difference from a sensing time point of other sensing data (e.g., the timestamp for the second sensing data) based on a last sensing time point of first sensing data (e.g., the timestamp for the first sensing data) collected until the localization is determined, that is, a latest sensing time point (e.g., a latest reference time point).

In operation 332, the timekeeping module 220 may transmit time-related information to the main processor 231. For example, the timekeeping module 220 may transmit, to the main processor 231, time information monitored for the sensing data (e.g., the timestamp for each sensing data and the calculated time difference between the sensing data). For reference, the timekeeping module 220 may transmit all time information at once. However, examples are not limited thereto. While the main processor 231 and the sub-processor 232 perform operations for a task, a portion of the time information requested for each operation may be selectively provided to the main processor 231 and/or the sub-processor 232.

In operation 333, the main processor 231 of the electronic device 200 may determine the localization of the device at the reference sensing time point (e.g., the timestamp for the first sensing data) of the first sensor 211 (e.g., the reference sensor) based on the time information described above. The main processor 231 may determine the localization of the electronic device 200 based on a time point that is temporally closest to a localization time point (e.g., the latest reference sensing time point), of the reference sensing time points. The localization time point may be a time point when the electronic device 200 initiates an operation for determining the localization. In operation 334, the main processor 231 may transmit the determined localization (e.g., AR device localization) to the sub-processor 232.

In operation 341, the sub-processor 232 may render an image for the reference sensing time point (e.g., the timestamp for the first sensing data) based on the determined localization. For example, the sub-processor 232 may render and generate an AR image corresponding to a field of view in the localization of the electronic device 200 at the reference sensing time point. In operation 342, the sub-processor 232 may transmit a rendering complete trigger to the timekeeping module 220. For example, in response to the rendered image being generated, the sub-processor 232 may notify the timekeeping module 220 of the completion of rendering. In operation 343, the timekeeping module 220 may determine a rendering complete time point based on a clock rate of the timekeeping module 220.

In operation 351, the timekeeping module 220 may calculate a rendering latency from the latest reference sensing time point (e.g., the timestamp for the first sensing data) to the rendering complete time point. For example, the timekeeping module 220 may calculate the rendering latency by subtracting the latest reference sensing time point from the rendering complete time point. In operation 352, the timekeeping module 220 may transmit the calculated rendering latency to the main processor 231. In operation 353, the main processor 231 may generate an output image by compensating the rendered image based on the calculated rendering latency. For example, in operation 353, the main processor 231 may perform a latency compensation operation 239. The latency compensation operation 239 may include warping based on any one or any combination of any two or more of a rotation transform, a translation, and a scale change corresponding to a localization change of the electronic device 200 during a task latency from the sensing time point of the reference sensing data to a task complete time point. For reference, it is described that the latency compensation operation 239 is performed by one of the processors of the application processor 230, but is not limited thereto, and may be performed by another separate processor (e.g., a dedicated processor for latency compensation) in the electronic device. In operation 354, the main processor 231 may transmit a corrected image to the display 240. In operation 355, the display 240 may display the generated output image.

The electronic device 200 may match coordinates of a real object and coordinates of a virtual object at a low latency in the field of AR and mixed reality (MR). The electronic device 200 of one or more embodiments may implement a low latency in mobile computing and/or edge computing, thereby preventing a coordinate mismatch between a real object and a virtual object due to a delay. To prevent the coordinate mismatch, the timekeeping module 220 of one or more embodiments operating with a clock separate from those of the main processor 231 and the sub-processor 232 in the electronic device 200 may separately manage time information related to localization and provide the main processor 231 with time information used for an individual operation.

Figure 4:
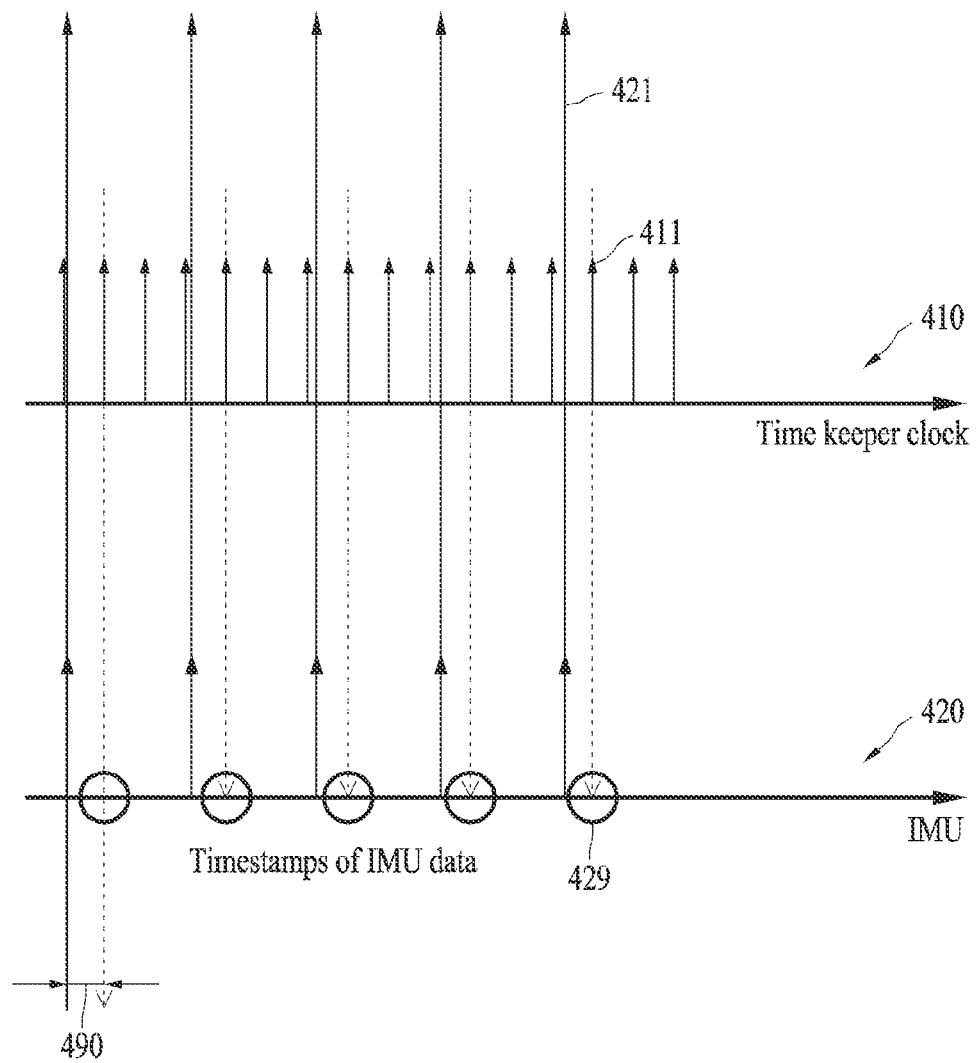
FIGS. 4 and 5 illustrate examples of determining a timestamp by a timekeeping module.
Figure 5:
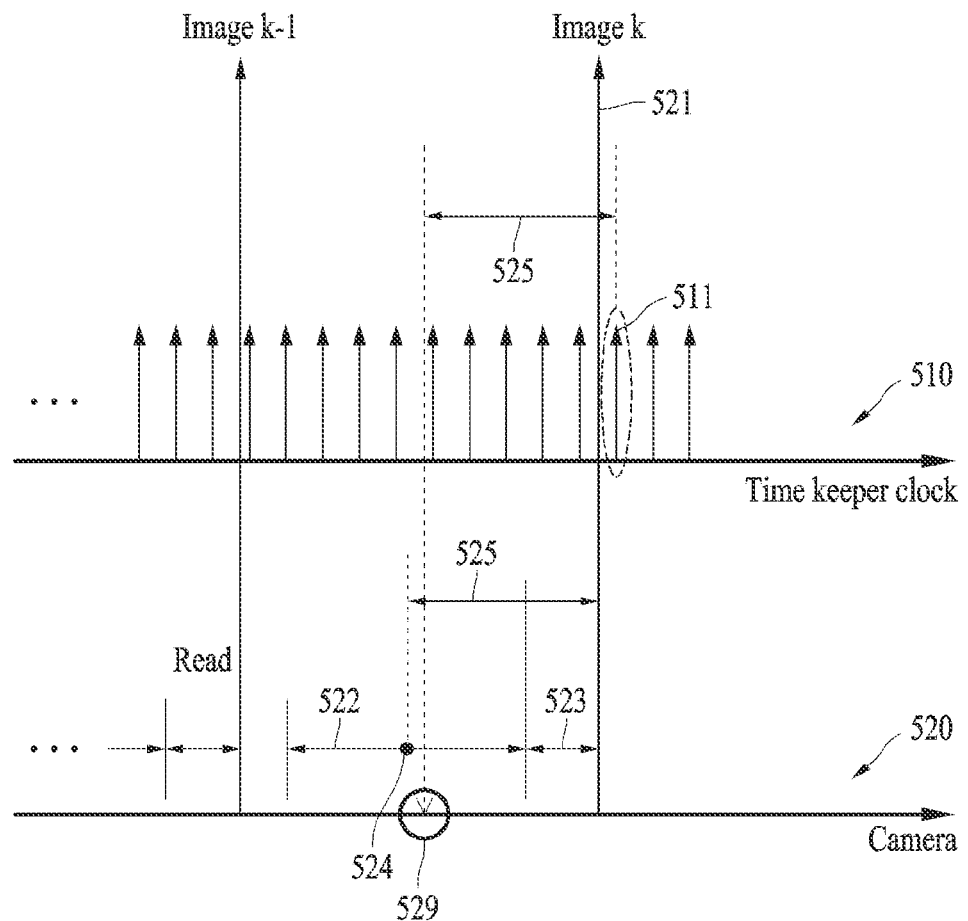

FIGS. 4 and 5 illustrate examples of determining a timestamp by a timekeeping module.

A timekeeping module (e.g., either one or both the timekeeping module 120 and the timekeeping module 220) may determine a sensing time point of sensing data generated based on sensing by all sensors based on a clock rate of a timekeeping processor (e.g., the timekeeping processor 221). The timekeeping module may record a timestamp determined based on the clock rate of the timekeeping module for each generated sensing data. For example, k-th sensing data may be generated based on k-th sensing by one sensor. The timekeeping module may receive a sensing trigger indicating the generation of the k-th sensing data from the sensor. Here, k may be an integer greater than or equal to "1". The timekeeping module may determine a clock timing immediately after the sensing trigger is received (e.g., a next clock timing generated once the sensing trigger is received) to be a sensing time point for the corresponding sensing data. The sensing time point may be recorded as a timestamp. All sensors included in the electronic device have their own clock circuits and may sense, generate, and transmit data at predetermined intervals (e.g., intervals according to clock rates determined by individual clock circuits). When outputs of the respective sensors are generated according to individual clocks, output intervals of the respective sensors may be asynchronous.

FIG. 4 illustrates an example operation of determining a sensing time point of a passive sensor (e.g., the second sensor 212 as a non-limiting example). An IMU will be described as an example of the passive sensor. The IMU may be a sensor that measures inertia, and may sense, for example, a 3-axis acceleration and/or a 3-axis angular velocity. The IMU may operate with an independent clock 420, and the IMU may operate at a faster rate than a camera sensor (e.g., the first sensor 211 as a non-limiting example). When the IMU is a low-price sensor, the IMU may operate at a predetermined clock rate without a trigger. The IMU may generate IMU data as the sensing data by sensing the 3-axis acceleration and/or the 3-axis angular velocity applied to the electronic device at every interval according to its own clock rate. When the IMU is the low-price sensor, a clock error of the IMU may occur approximately up to 10%. In response to receiving a sensing trigger 421 of the IMU data from the IMU, the timekeeping module may store a timestamp (e.g., the timestamp for the second sensing data) indicating a latest (e.g., a next subsequent) timing 411 updated according to the clock rate of the timekeeping processor after the sensing trigger 421 as a sensing time point 429 of the IMU data.

For reference, when a clock 410 of the timekeeping module is sufficiently fast, a difference 490 between an actual time of the generation of the IMU data and the sensing time point indicated by the timestamp may be trivial. For example, when the clock 410 of the timekeeping module is faster than the clock 420 of the IMU, the error may be ignored. For example, the clock rate of the timekeeping module may be more than 100 times faster than the fastest sampling rate of the plurality of sensors, and thus the error may be ignored. The timekeeping module may have a clock rate better than the error level of the IMU.

FIG. 5 illustrates an operation of determining a sensing time point of a camera sensor among vision sensors.

According to an example, a reference sensor (e.g., the first sensor 211 as a non-limiting example) of an electronic device may include a camera sensor that captures a camera image, among vision sensors. The camera sensor may generate image data (e.g., camera data) by capturing a scene.

The camera sensor may perform continuous shooting at predetermined frames per second (FPS). In FIG. 5, a clock 510 of a timekeeping module and a sensing time axis 520 of the camera sensor are shown.

Similar to the IMU described above with reference to FIG. 4, the timekeeping module may use a latest clock time point (e.g., the timestamp for the first sensing data) for the camera sensor. For example, a sensing time point of camera sensing data of the camera sensor may be determined to be a timestamp indicating a clock timing 511 of the timekeeping module after a sensing trigger 521 indicating that a k-th image is obtained. For example, in response to receiving the sensing trigger 521 of the camera sensing data from the camera sensor, the timekeeping module may store a timestamp indicating a latest time updated according to its own clock rate after receiving the sensing trigger 521 as the sensing time point of the camera sensing data. Accordingly, the timekeeping module may record a sensing time point of the k-th image data based on the clock timing at the time point when reading of the camera data is finished. The timekeeping module may be designed to have a clock rate sufficiently faster than sampling rates (e.g., data generation frequencies) of the sensors including the camera sensor.

However, examples are not limited thereto. Additionally, the sensing time point of the camera data may be calibrated. For example, the timekeeping module may calibrate the sensing time point of the camera sensor based on either one or both of an exposure time 522 and a read time 523 of the camera image. For example, a generation time point 524 of the camera data may be treated as a time point 524 corresponding to the median of the exposure time 522. On the other hand, the sensing trigger of the camera sensing data may occur after the exposure time 522 and the read time 523 elapse and reading is completed. In other words, there may occur a difference between the generation time point 524 of the camera sensing data and the read time point of the camera sensing data. The difference between the generation time point 524 of the camera sensing data and the read time point of the camera sensing data may be calculated as a calibration time 525 by the timekeeping module. According to the example shown in FIG. 5, the difference between the generation time point 524 and the read time point of the camera sensing data may be expressed as Equation 1 below, for example.

$$\text{read time point} - \text{generation time point} = \text{(read time)} + \frac{1}{2} \text{(exposure time)} \quad \text{Equation 1}$$

In Equation 1 above, the generation time point 524 of the camera sensing data may be assumed to be a time point corresponding to half of the exposure time. The timekeeping module may calibrate a sensing time point of camera data when a read time and an exposure time are given.

For example, the camera sensor may provide an exposure value representing the exposure time 522 to the timekeeping module. The timekeeping module may store the exposure time 522 in a memory (e.g., the memory 222). The timekeeping module may determine a calibrated sensing time point for the camera sensing data by subtracting a time corresponding to a half the exposure time 522 from the clock timing 511 immediately after the sensing trigger 521 occurs.

Furthermore, it may be assumed that the read time 523 is constant for every capturing by the camera sensor. The timekeeping module may store in advance the read time 523 measured for the camera sensor in the memory. The timekeeping module may determine a sensing time point 529 more precisely calibrated for the camera sensing data by subtracting the calibration time 525 (e.g., the sum of the read time 523 and a half the exposure time 522) from the clock timing 511 immediately after the sensing trigger 521 occurs.

Figure 6:
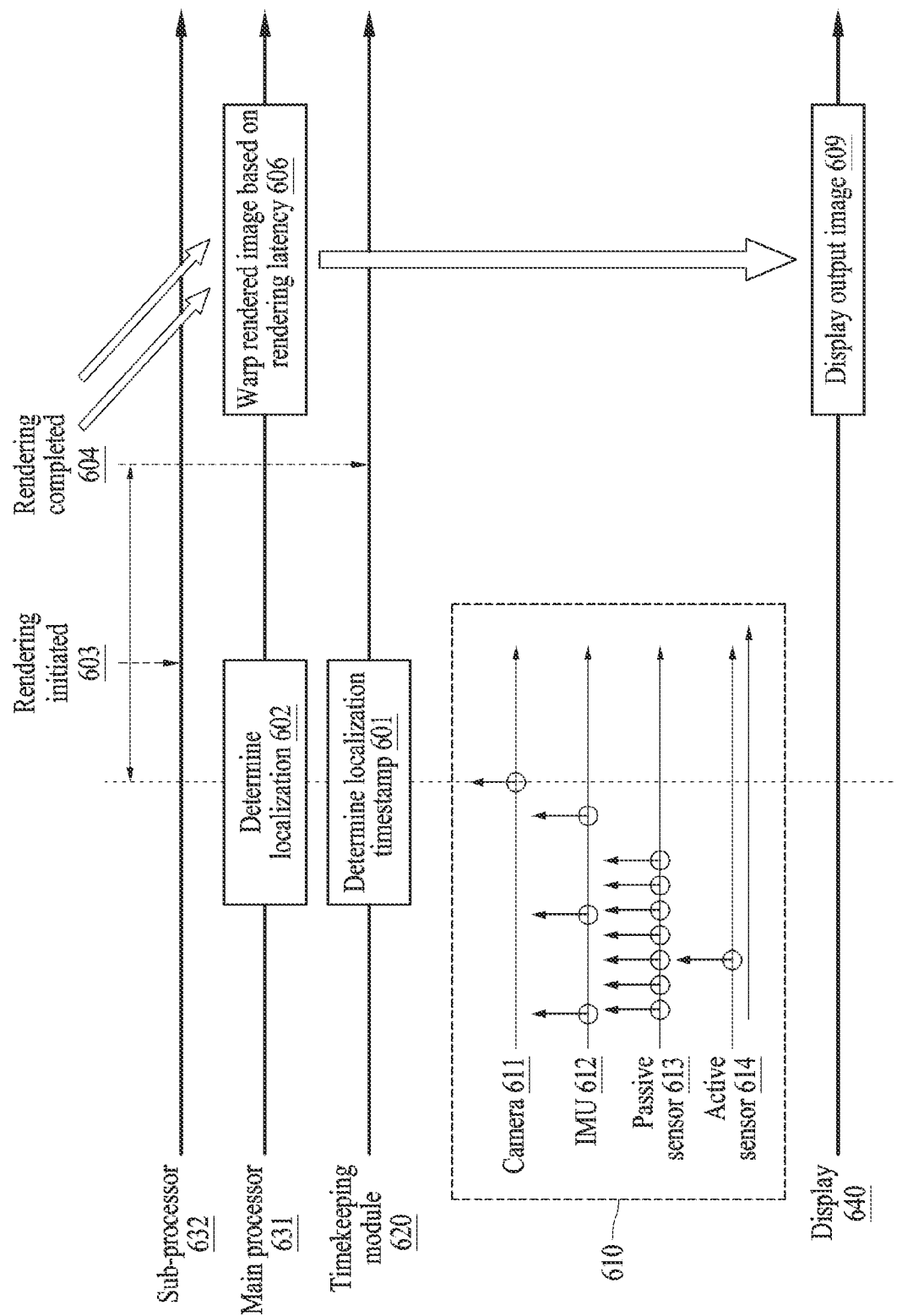
FIG. 6 illustrates an example of timings for determining localization, rendering, and displaying an output image by an electronic device.

FIG. 6 illustrates an example of timings for determining localization, rendering, and displaying an output image by an electronic device.

A timekeeping module 620 of an electronic device may determine sensing time points for sensing data of sensors 610. For example, the timekeeping module 620 may determine sensing time points respectively for a camera sensor 611, an IMU 612, a passive sensor 613, and an active sensor 614. The electronic device may correspond to the electronic device of any one, any combination, or all of FIGS. 1-5, as a non-limiting example.

In operation 601, the timekeeping module 620 may determine a localization timestamp when localization by a main processor 631 is initiated. The localization timestamp may be determined based on reference sensing data at a latest reference sensing time point of the sensing time points (e.g., reference sensing time points) of reference sensing data collected until a time point when the localization is performed. A sensing time point of a vision sensor may be a reference sensing time point of the localization. The reference sensing data may be camera sensing data sensed by the camera sensor 611 as the vision sensor, as described above.

In operation 602, the main processor 631 (e.g., the main processor 231 of FIG. 2 as a non-limiting example) may determine the localization based on the localization timestamp. For example, the main processor 631 may determine the localization (e.g., a pose and a location) of the electronic device at the localization timestamp, based on the respective sensing data and sensing time points of the sensors 610 on the basis of the time point corresponding to the localization timestamp.

In operation 603, in response to determining the localization with respect to the localization timestamp, the main processor 631 may instruct initiation of a task (e.g., rendering). For example, the main processor 631 may instruct a sub-processor 632 (e.g., the sub-processor 232 of FIG. 2) to initiate rendering.

In operation 604, the timekeeping module 620 may determine and record a time point indicating the completion of rendering based on a clock rate of a timekeeping processor (e.g., a timekeeping processor of the timekeeping module 620). The timekeeping module 620 may calculate a rendering latency, which is a time taken from the localization timestamp to the completion of rendering. Accordingly, the timekeeping module 620 may calculate the rendering latency including a rendering initiation time point since a time point corresponding to the localization timestamp determined in operation 601, and a time from the rendering initiation time point to a rendering complete time point.

In operation 606, the main processor 631 may warp a rendered image based on the rendering latency. The main processor 631 may predict a localization change of the electronic device from the localization timestamp to the rendering complete time point, and perform warping corresponding to the predicted localization change. The main processor 631 may generate an output image by warping the rendered image. The warping may be an operation of transforming a coordinate system of pixels included in the rendered image, a non-limiting example of which will be described below with reference to FIG. 9.

In operation 609, a display 640 (e.g., the display 240 of FIG. 2) may display the output image. For example, the display 640 may provide the output image to a user by forming an image on a transparent or translucent material. The output image may include a pair of a first image (e.g., a left image) and a second image (e.g., a right image), and the display 640 may provide the first image and the second image toward a portion corresponding to the left eye and a portion corresponding to the right eye of the user, respectively, thereby providing a stereoscopic image having depth to the user.

As described above, the electronic device may monitor and record a time point when data computation is finished (e.g., an instant when the rendered image is transmitted to the display) through the timekeeping module 620. Accordingly, the electronic device may directly calculate an end-to-end latency (delay) from the sensing by the sensor to the completion of rendering. The electronic device of one or more embodiments may reduce an error caused by the rendering latency described in FIG. 6 as well as an error caused by the difference between the sensing time points of the sensors 610 described in FIGS. 1 to 5. Accordingly, the electronic device of one or more embodiments may greatly reduce recognition and rendering errors in a situation in which the electronic device is moving.

Figure 7:
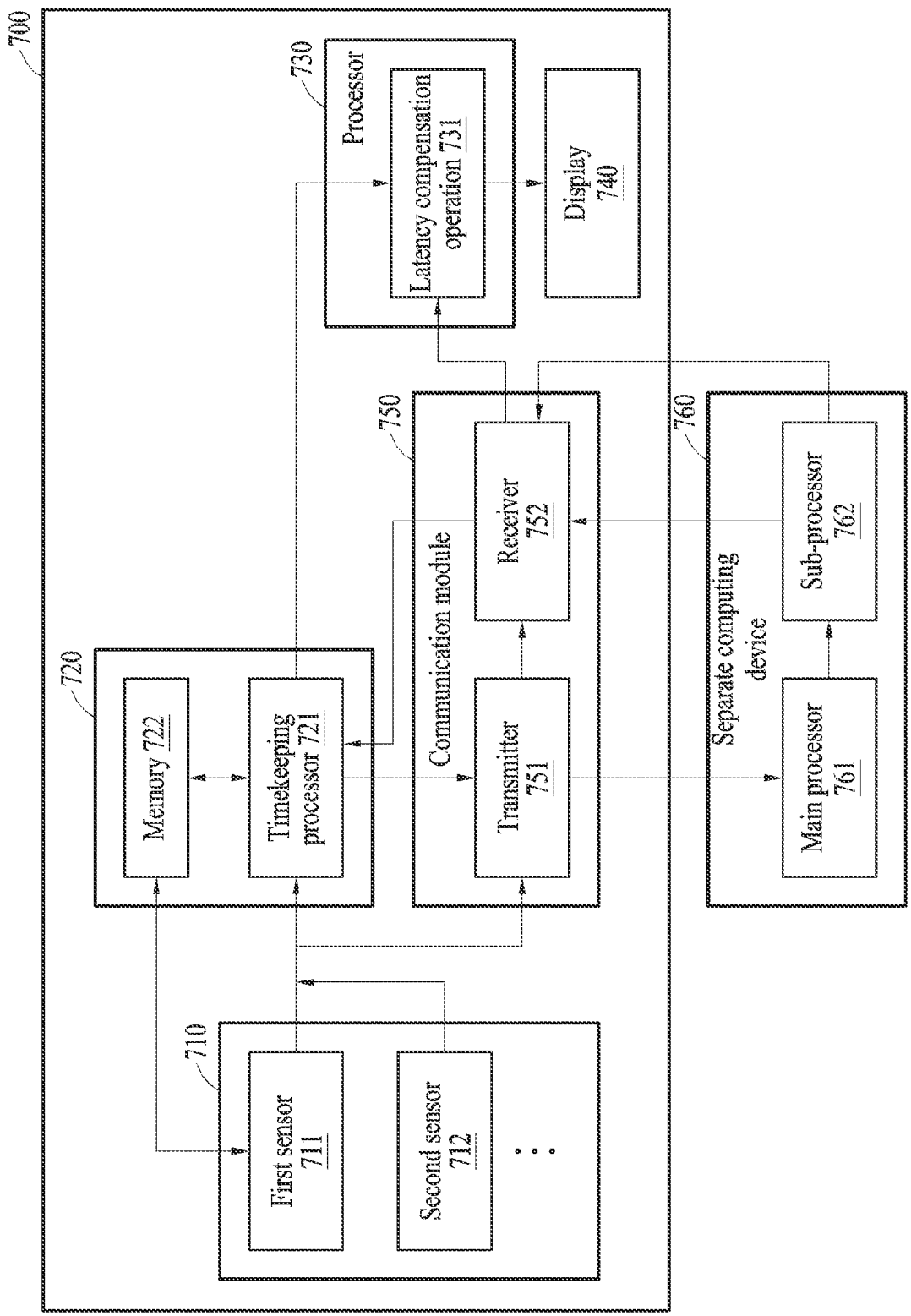
FIGS. 7 and 8 illustrate examples of requesting an operation for a task from an external server by an electronic device.
Figure 8:
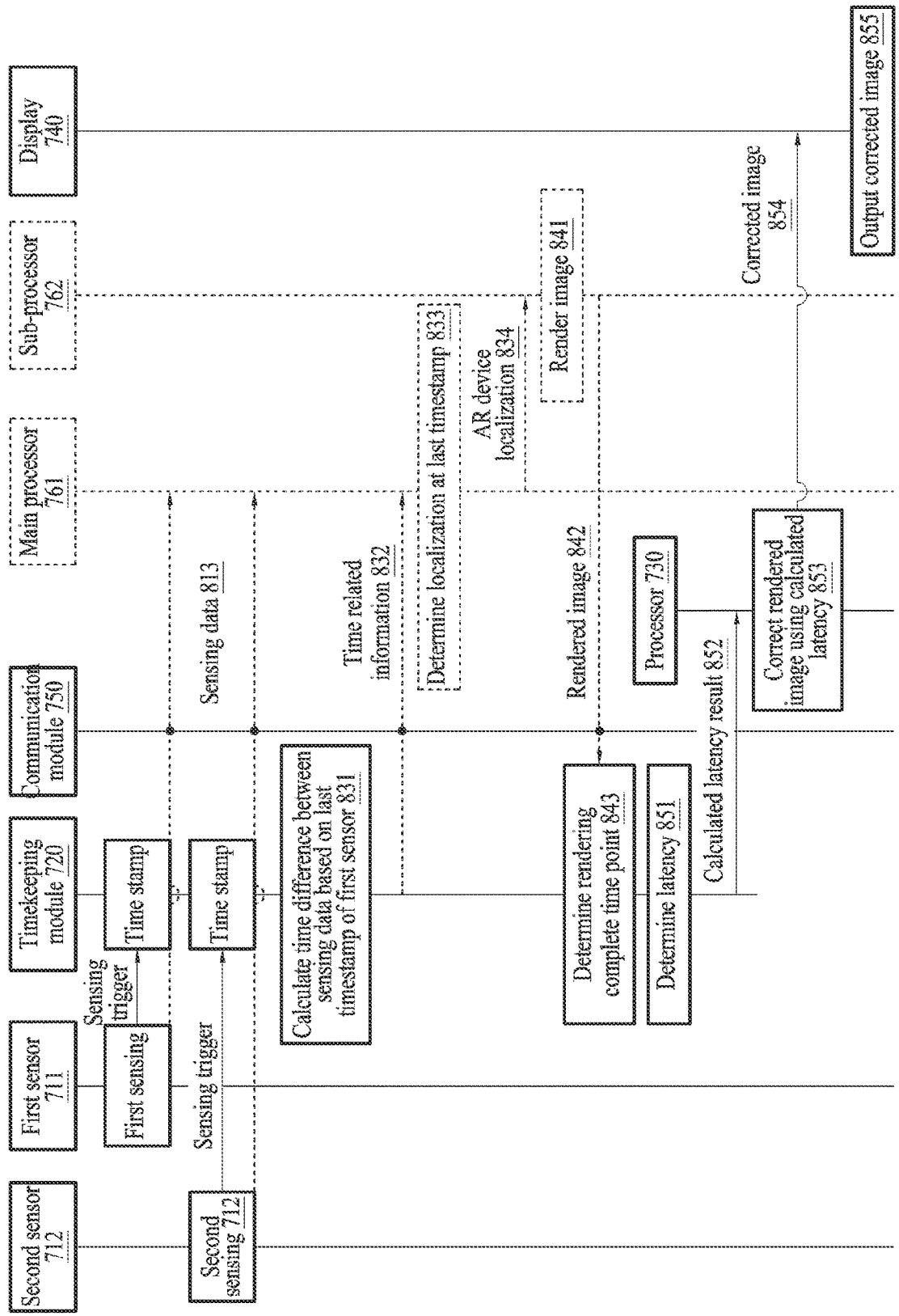

FIGS. 7 and 8 illustrate examples of requesting an operation for a task from an external server by an electronic device.

In an electronic device 700 shown in FIG. 7, sensors 710 including a first sensor 711 and a second sensor 712, a timekeeping module 720 including a timekeeping processor 721 and a memory 722, and a display 740 may operate similarly as described above in FIG. 2, and thus, a description thereof will be omitted. For example, the electronic device 700 may correspond to the electronic device of any one, any combination, or all of FIGS. 1-6, as a non-limiting example. In an example, unlike the electronic device 200 shown in FIG. 2, the electronic device 700 of FIG. 7 may request a series of computations for a target task from a separate computing device 760 (e.g., an external device). The separate computing device 760 may be implemented as an edge computing device or a cloud server having a main processor 761 and a sub-processor 762 for operations of the target task.

The electronic device 700 may further include a communication module 750. A transmitter 751 of the communication module 750 may transmit sensing time points of sensing data of the plurality of sensors 710 and a time difference between the sensing data to the external device (e.g., the separate computing device 760). A receiver 752 of the communication module 750 may receive a task result from the external device.

The timekeeping module 720 may calculate a task latency based on a time point when the task result is received. The task latency may include a transmission delay and a reception delay according to communication of the communication module 750, and a time when the task is performed by the external device. Accordingly, the electronic device 700 may calculate only accurate time information including delays due to communication, and the separate computing device 760 may perform operations for the target task, whereby the efficiency of all computations may improve.

The operations of the electronic device 700 and the external device will be described in more detail with reference to FIG. 8.

For example, in operations 813, the first sensor 711 and the second sensor 712 may transmit sensing data to the communication module 750. The communication module 750 may transmit the sensing data to the main processor 761 of the separate computing device 760.

In operation 831, the timekeeping module 720 may calculate a time difference between the sensing data based on a last timestamp of the first sensor 711. In operation 832, the communication module 750 may transmit the calculated time difference and time information including the sensing time points of the respective sensing data to the separate computing device 760. In operation 833, the main processor 761 of the separate computing device 760 may determine localization of the electronic device 700 at the last timestamp. In operation 834, the main processor 761 may transmit the localization of an AR device (e.g., the electronic device 700) to the sub-processor 762.

In operation 841, the sub-processor 762 may render an image for the determined localization. In operation 842, the communication module 750 may receive the rendered image from the separate computing device 760. In operation 843, the timekeeping module 720 may determine a time point when the communication module 750 receives the rendered image to be a rendering complete time point.

In operation 851, the timekeeping module 720 may determine a rendering latency from the timestamp corresponding to a localization time point to the time point when the rendered image is received. In operation 852, the timekeeping module 720 may transmit the calculated rendering latency to the processor 730. In operation 853, the processor 730 may correct the rendered image using the calculated rendering latency. For example, the processor 730 may perform a latency compensation operation 731 (e.g., image warping). In operation 854, the processor 730 may transmit a corrected image (e.g., an output image) to the display 740. In operation 855, the display 740 may output the corrected image.

Figure 9:
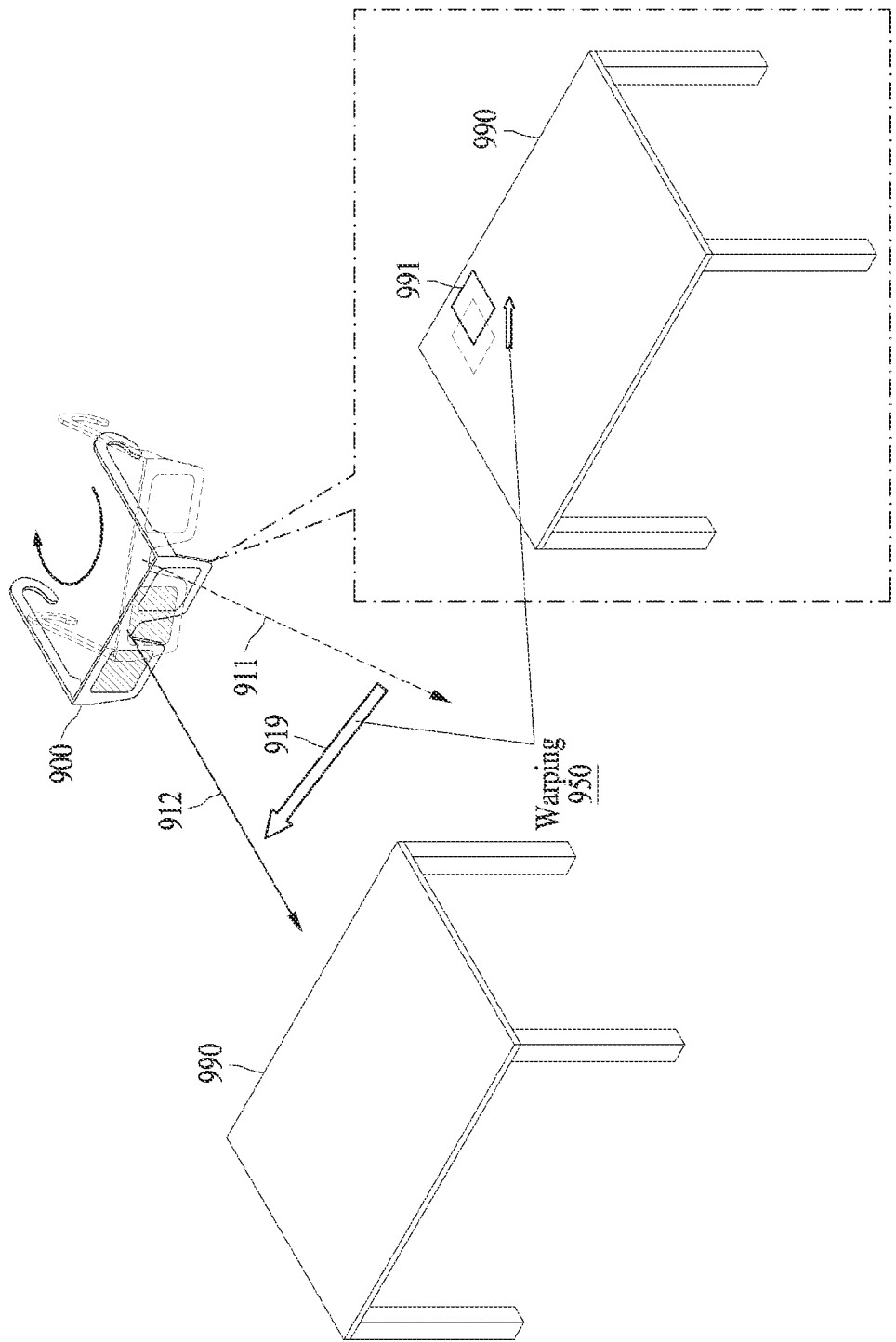
FIG. 9 illustrates an example of correcting an image in view of a rendering latency by an electronic device for providing augmented reality (AR).

FIG. 9 illustrates an example of correcting an image in view of a rendering latency by an electronic device for providing augmented reality (AR).

An electronic device 900 may be implemented as an AR glasses device as shown in FIG. 9. As described above with reference to FIGS. 1-8, the electronic device 900 may correct a rendered image based on a rendering latency. One or more processors of the electronic device 900 may perform warping based on any one or any combination of any two or more of a rotation transform, a translation, and a scale change corresponding to a localization change of the electronic device 900 during a task latency from a sensing time point of reference sensing data to a task complete time point. The rotation transform, the translation, and the scale change may be expressed as a coordinate transformation matrix between views of the electronic device 900. A view of the electronic device 900 may vary according to the localization (e.g., a pose and a location) of the electronic device 900, and may correspond to, for example, a direction and a location viewed by a vision sensor (e.g., a camera sensor) of the electronic device 900. In other words, the view of the electronic device 900 may be interpreted as corresponding to a camera view, and the coordinate transformation matrix between views may be expressed similarly to a coordinate transformation matrix of extrinsic camera calibration. One or more processors of the electronic device 900 may perform any one, any combination, or all operations described above with respect to FIGS. 1-8. Further, one or more memories of the electronic device 900 may store instructions that, when executed by the one or more processors, configure the one or more processors to perform any one, any combination, or all operations described above with respect to FIGS. 1-8. For example, the electronic device 900 may correspond to the electronic device of any one, any combination, or all of FIGS. 1-8, as a non-limiting example.

The warping may be an operation of generating an output image by applying, to the rendered image, a coordinate transformation matrix including any one or any combination of a rotation transform parameter, a translation parameter, and a scale change parameter. The coordinate transformation matrix calculated based on the rendering latency may transform coordinates according to a first coordinate system corresponding to a view (e.g., a first view direction) positioned at the localization determined at the localization timestamp into coordinates according to a second coordinate system corresponding to a view (e.g., a second view direction) positioned at localization predicted at the rendering complete time point. The electronic device 900 may rotate and translate coordinates of each pixel in an AR image including virtual content generated according to the first coordinate system to coordinates according to the second coordinate system described above.

For example, in FIG. 9, the electronic device 900 may determine a localization timestamp while facing a first view direction 911. Thereafter, while rendering is performed, the localization of the electronic device 900 may change from the first view direction 911 to a second view direction 912. A view direction may be a direction that a reference vector of the electronic device 900 faces, and for example, a direction viewed by a vision sensor (e.g., a camera sensor). The electronic device 900 may perform warping 950 to transform coordinates of the virtual content generated in the first coordinate system corresponding to the first view direction 911 into the second coordinate system corresponding to the second view direction 912. Accordingly, the electronic device 900 may output virtual content 991 at world coordinates that accurately fit a real object 990 (e.g., a desk), despite a localization change 919 during the rendering latency.

Figure 10:
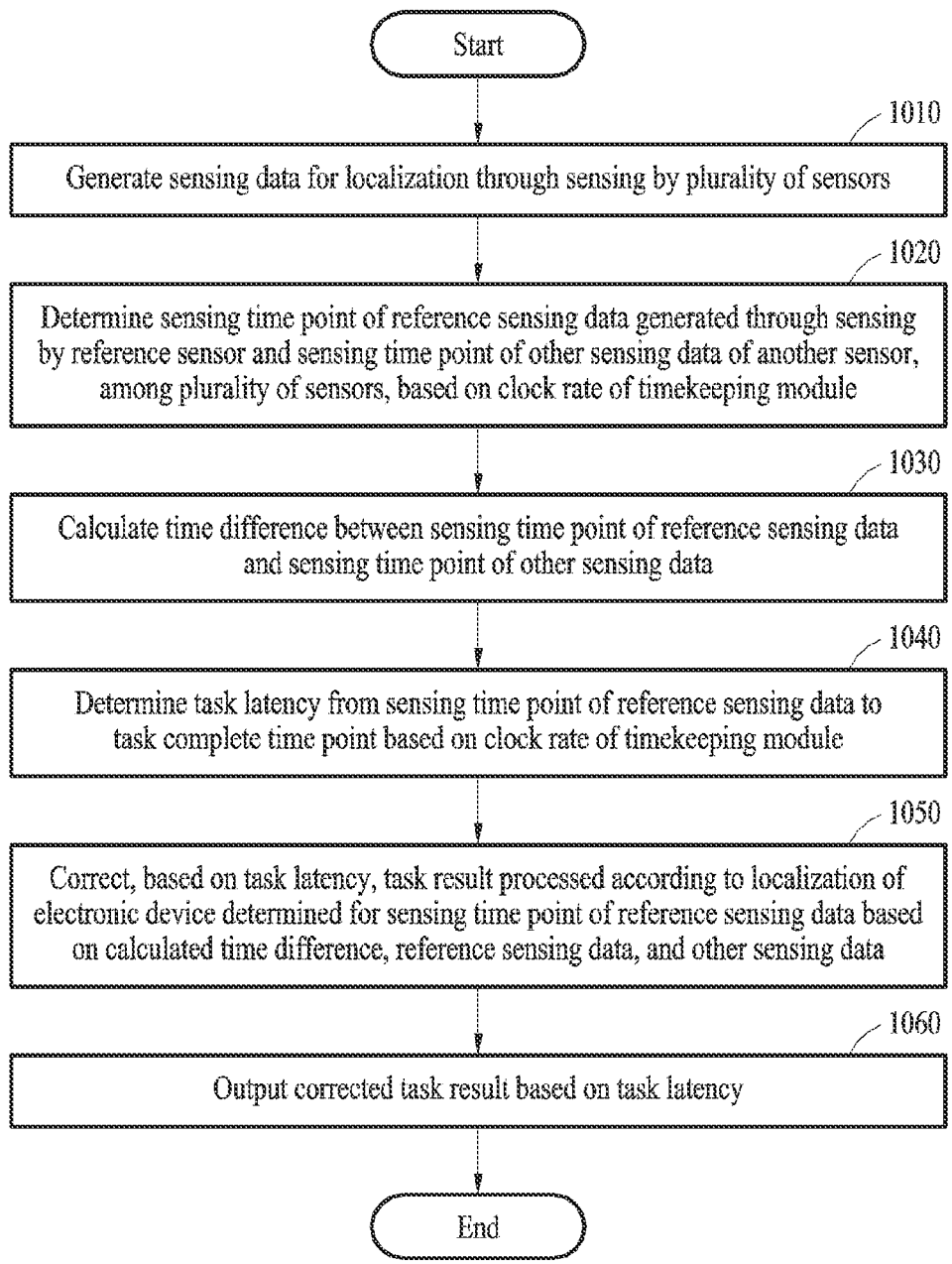
FIG. 10 illustrates a method of independently managing and using a sensing time point for localization.

FIG. 10 illustrates a method of independently managing and using a sensing time point for localization.

First, in operation 1010, an electronic device may generate sensing data for localization through sensing by a plurality of sensors. For example, the electronic device may generate the reference sensing data by performing one of an operation of capturing a camera image by a camera sensor, an operation of sensing radar data by a radar sensor, and an operation of sensing a lidar image by a lidar sensor. The electronic device may calibrate a sensing time point of the camera sensor based on either one or both of an exposure time and a read time of the camera image. In addition, the electronic device may generate other sensing data by performing any one or any combination of any two or more of an operation of sensing an inertia of the electronic device by an IMU, an operation of performing sensing by an active sensor in response to receiving a trigger input, and an operation of performing sensing by a passive sensor at predetermined intervals.

In operation 1020, the electronic device may determine a sensing time point of reference sensing data generated through sensing by a reference sensor and a sensing time point of other sensing data of another sensor, among the plurality of sensors, based on a clock rate of a timekeeping module.

In operation 1030, the electronic device may calculate a time difference between the sensing time point of the reference sensing data and the sensing time point of the other sensing data.

In operation 1040, the electronic device may determine a task latency from the sensing time point of the reference sensing data to a task complete time point based on the clock rate of the timekeeping module. For example, the electronic device may determine a rendering latency from the sensing time point of the reference sensing data to a time point when rendering of an image for AR is completed.

In operation 1050, the electronic device may correct, based on the task latency, a task result processed according to localization of the electronic device determined for the sensing time point of the reference sensing data based on the calculated time difference, the reference sensing data, and the other sensing data. For example, the electronic device may generate an output image by correcting an image rendered according to localization of the electronic device determined for the sensing time point of the reference sensing data based on the rendering latency. As described with reference to FIG. 9, the electronic device may perform warping based on any one or any combination of any two or more of a rotation transform, a translation, and a scale change corresponding to a localization change of the electronic device during a task latency from a sensing time point of reference sensing data to a task complete time point.

For example, the electronic device may determine the localization of the electronic device for the sensing time point of the reference sensing data based on the calculated time difference, the reference sensing data, and the other sensing data. The electronic device may generate a rendered image as a task result for the localization.

As another example, the electronic device may request rendering from an external device (e.g., a separate computing device) and receive the rendered image from the external device. In this case, the electronic device may transmit the sensing time points of the sensing data of the plurality of sensors and the time difference to the external device, in operation 1030 described above. Further, the electronic device may receive the task result from the external device and calculate the task latency based on a time point when the task result is received, in operation 1040.

In operation 1060, the electronic device may output the corrected task result based on the task latency. For example, the electronic device may display an output image on a display.

The operation of the electronic device is not limited to the above description and may be performed together with the operations described above with reference to FIGS. 1 to 9 in parallel or in a time-series manner.

The electronic device may be applied to any type of device in which a sensor system requiring time synchronization is mounted. The timekeeping module may be implemented as hardware in the form of a chip or may be a combination of hardware and software. In an example, the electronic device may be implemented as a wireless communication device equipped with a camera and an IMU, a sensor system for vehicles, and an AR device. Furthermore, the electronic device may be applied to robot control systems, and all electronic systems machine/aviation/maritime control.

The electronic device of one or more embodiments may measure and record an accurate time of data measured by each sensor and an accurate generation time of an operation result using the measured data. The electronic device of one or more embodiments may correct an error in motion estimation using the measured time and improve a delay of a rendering result. For the accurate calculation of the estimated delay, the electronic device of one or more embodiments may store and calibrate pre-calculated measurement time errors (e.g., calibration information) according to the characteristics of the sensors.

The electronic devices, sensors, timekeeping modules, processors, output modules, first sensors, second sensors, memories, main processors, sub-processors, displays, timekeeping processors, communication modules, transmitters, receivers, separate computing devices, camera sensors, IMUs, passive sensors, active sensors, electronic device 100, sensor 110, timekeeping module 120, processor 130, output module 140, memory 150, electronic device 200, sensors 210, first sensor 211, second sensor 212, timekeeping module 220, processor 221, memory 222, processor 230, main processor 231, sub-processor 232, display 240, sensors 610, camera sensor 611, IMU 612, passive sensor 613, active sensor 614, timekeeping module 620, main processor 631, sub-processor 632, display 640, electronic device 700, sensors 710, first sensor 711, second sensor 712, timekeeping module 720, timekeeping processor 721, memory 722, processor 730, display 740, communication module 750, transmitter 751, receiver 752, separate computing device 760, main processor 761, sub-processor 762, electronic device 900, and other apparatuses, units, modules, devices, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An electronic device, comprising:
    a timekeeping processor configured to:
        determine a sensing time point of reference sensing data, generated through sensing by a reference sensor of a plurality of sensors, and a sensing time point of other sensing data of another sensor of the plurality of sensors, based on a clock rate of the timekeeping processor;
        determine a time difference between the sensing time point of the reference sensing data and the sensing time point of the other sensing data; and
        determine a task latency from the sensing time point of the reference sensing data to a task complete time point of a task result processed according to localization of the electronic device determined for the sensing time point of the reference sensing data, based on the clock rate of the timekeeping processor; and
    one or more other processors configured to correct, based on the task latency, the task result based on the determined time difference, the reference sensing data, and the other sensing data.

2. The device of claim 1, further comprising:
    a plurality of sensors configured to generate the reference sensing data and the other sensing data; and
    an output interface configured to output the corrected task result based on the task latency.

3. The device of claim 1, wherein
    for the determining of the task latency, the timekeeping processor is further configured to determine a rendering latency from the sensing time point of the reference sensing data to a time point when rendering of an image for augmented reality (AR) is completed, and
    for the correcting, the one or more other processors are further configured to generate an output image by correcting an image rendered according to the localization of the electronic device determined for the sensing time point of the reference sensing data based on the rendering latency.

4. The device of claim 1, wherein the reference sensor comprises any one or any combination of any two or more of a vision sensor of a camera sensor configured to capture a camera image, a radar sensor configured to sense radar data, and a lidar sensor configured to sense a lidar image.

5. The device of claim 1, wherein
    for the generating of the sensing data, the reference sensor comprises a camera sensor configured to capture a camera image, and
    for the determining of the sensing time point of the reference sensing data, the timekeeping processor is further configured to calibrate a sensing time point of the camera sensor based on either one or both of an exposure time and a read time of the camera image.

6. The device of claim 1, wherein the localization of the electronic device comprises either one or both of a pose and a location of the electronic device.

7. The device of claim 1, wherein, for the correcting, the one or more other processors are further configured to perform warping based on any one or any combination of any two or more of a rotation transform, a translation, and a scale change corresponding to a localization change of the electronic device during the task latency from the sensing time point of the reference sensing data to the task complete time point.

8. The device of claim 1, wherein the other sensor comprises any one or any combination of any two or more of an inertial measurement unit (IMU) configured to sense an inertia of the electronic device, an active sensor configured to perform sensing in response to receiving a trigger input, and a passive sensor configured to perform sensing at predetermined intervals.

9. The device of claim 1, wherein, for the correcting,
    a main processor of the one or more other processors is configured to determine the localization of the electronic device for the sensing time point of the reference sensing data based on the determined time difference, the reference sensing data, and the other sensing data, and
    a sub-processor of the one or more other processors is configured to generate a rendered image as a task result for the localization.

10. The device of claim 1, further comprising:
    a communication module configured to, for the determining of the time difference, transmit sensing time points of the sensing data of the plurality of sensors and the time difference to an external device and receive the task result from the external device,
    wherein the timekeeping processor is further configured to, for the determining of the task latency, determine the task latency based on a time point when the task result is received.

11. The device of claim 10, wherein the task latency comprises a transmission delay and a reception delay according to communication of the communication module, and a time when the task is performed by the external device.

12. A processor-implemented method, comprising:
    determining a sensing time point of reference sensing data, generated through sensing by a reference sensor of a plurality of sensors, and a sensing time point of other sensing data of another sensor of the plurality of sensors, based on a clock rate of a timekeeping processor;
    determining a time difference between the sensing time point of the reference sensing data and the sensing time point of the other sensing data;

determining a task latency from the sensing time point of the reference sensing data to a task complete time point of a task result processed by one or more other processors according to localization of the electronic device determined for the sensing time point of the reference sensing data, based on the clock rate of the timekeeping processor; and correcting, based on the task latency, a the task result based on the determined time difference, the reference sensing data, and the other sensing data.

13. The method of claim 12, further comprising:
generating, by a plurality of sensors, the reference sensing data and the other sensing data; and
outputting the corrected task result based on the task latency.

14. The method of claim 12, wherein
the determining of the task latency comprises determining a rendering latency from the sensing time point of the reference sensing data to a time point when rendering of an image for augmented reality (AR) is completed, and
the correcting comprises generating an output image by correcting an image rendered according to the localization of the electronic device determined for the sensing time point of the reference sensing data based on the rendering latency.

15. The method of claim 12, wherein the generating of the sensing data comprises generating the reference sensing data by performing any one or any combination of any two or more of an operation of capturing a camera image by a camera sensor of the reference sensor, an operation of sensing radar data by a radar sensor of the reference sensor, and an operation of sensing a lidar image by a lidar sensor of the reference sensor.

16. The method of claim 12, wherein
the generating of the sensing data comprises capturing a camera image by a camera sensor that is the reference sensor, and
the determining of the sensing time point of the reference sensing data comprises calibrating a sensing time point of the camera sensor based on either one or both of an exposure time and a read time of the camera image.

17. The method of claim 12, wherein the localization of the electronic device comprises either one or both of a pose and a location of the electronic device.

18. The method of claim 12, wherein the correcting comprises performing warping based on any one or any combination of any two or more of a rotation transform, a translation, and a scale change corresponding to a localization change of the electronic device during the task latency from the sensing time point of the reference sensing data to the task complete time point.

19. The method of claim 12, wherein the generating of the sensing data comprises generating the other sensing data by performing any one or any combination of any two or more of an operation of sensing an inertia of the electronic device by an inertial measurement unit (IMU) of the sensors, an operation of performing sensing by an active sensor of the sensors in response to receiving a trigger input, and an operation of performing sensing by a passive sensor of the sensors at predetermined intervals.

20. The method of claim 12, wherein the correcting comprises:
determining the localization of the electronic device for the sensing time point of the reference sensing data based on the determined time difference, the reference sensing data, and the other sensing data; and
generating a rendered image as a task result for the localization.

21. The method of claim 12, wherein
the determining of the time difference comprises transmitting sensing time points of the sensing data of the plurality of sensors and the time difference to an external device, and
the determining of the task latency comprises receiving the task result from the external device and determining the task latency based on a time point when the task result is received.

22. A non-transitory computer-readable storage medium storing instructions that, when executed by either one or both of the timekeeping processor and the one or more other processors, configure either one or both of the timekeeping processor and the one or more other processors to perform the method of claim 12.

23. An electronic device, comprising:
a processor configured to:
determine a sensing time point of first sensing data of a first sensor and a sensing time point of second sensing data of a second sensor, dependent on a clock rate of the processor;
determine a time difference between the sensing time point of the first sensing data and the sensing time point of the second sensing data, wherein a task is performed for the sensing time point of the first sensing data by one or more other processors based on the determined time difference; and
determine a task latency of the performed task from the sensing time point of the first sensing data to a task complete time point of a task result of the performed task, based on the clock rate of the processor,
wherein the one or more other processors are configured to control the electronic device based on the determined task latency.

24. The device of claim 23, wherein, for the determining of the sensing time point of the second sensing data, the processor is configured to determine, in response to receiving a sensing trigger of the second sensing data from the second sensor, the sensing time point of the second sensing data as being a next subsequent timing updated according to the clock rate of the processor after the sensing trigger is received.

25. The device of claim 23, wherein, for the determining of the sensing time point of the first sensing data, the processor is configured to, in response to receiving a sensing trigger of the first sensing data from the first sensor:
determine a next subsequent timing updated according to the clock rate of the processor after the sensing trigger is received;
determine a calibration time of the first sensor based on one or more processing times of the first sensor; and
determine the sensing time point of the first sensing data based on a difference between the next subsequent timing and the calibration time.

26. The method of claim 25, wherein the one or more processing times comprises a read time of the first sensor and an exposure time of the first sensor.

27. The device of claim 23, wherein the clock rate of the processor is different than a clock rate of each of first sensor and the second sensor.

28. The device of claim 23, wherein, for the controlling, the one or more other processors are configured to correct the task result of the performed task based on the task latency.

* * * * *